United States Patent [19]

Yamamoto et al.

[11] Patent Number: 5,253,259
[45] Date of Patent: Oct. 12, 1993

[54] FREQUENCY DOUBLER AND VISIBLE LASER SOURCE HAVING A HEATER

[75] Inventors: Kazuhisa Yamamoto, Settsu; Tetsuo Taniuchi, Kobe; Kiminori Mizuuchi, Hirakata, all of Japan

[73] Assignee: Matsushita Electric Industrial Co., Ltd., Osaka, Japan

[21] Appl. No.: 825,124

[22] Filed: Jan. 24, 1992

[30] Foreign Application Priority Data

Feb. 7, 1991 [JP] Japan ............................ 3-016199

[51] Int. Cl.$^5$ .............................................. H01S 3/10
[52] U.S. Cl. .................................. 372/22; 359/332; 385/14; 385/122; 385/130
[58] Field of Search ......................... 372/20, 21, 22; 359/325, 326, 327, 328, 332; 385/11, 14, 122, 129, 130, 141, 142

[56] References Cited

U.S. PATENT DOCUMENTS

| | | | |
|---|---|---|---|
| 5,038,352 | 8/1991 | Lenth et al. | 372/21 |
| 5,064,265 | 11/1991 | Khanarian et al. | 385/130 |
| 5,093,832 | 3/1992 | Bethune et al. | 372/21 |
| 5,121,250 | 6/1992 | Shinozaki et al. | 359/328 |
| 5,128,948 | 7/1992 | Papuchon et al. | 372/21 |

OTHER PUBLICATIONS

Lim, et al "Blue Light Generation By Frequency Doubling In Periodically Poled Lithium Niobate Channel Waveguide," Electronics Letters, vol. 25, pp. 731-732, May 25, 1989.

Primary Examiner—Frank Gonzalez
Attorney, Agent, or Firm—Stevens, Davis, Miller & Mosher

[57] ABSTRACT

A frequency doubler of the invention employs a nonlinear optical effect of stabilizing the harmonic output from the frequency doubler. The frequency doubler has an LiNbO$_3$ substrate, domain inverted regions and a waveguide, which are formed on the substrate, and a thin-film heater formed on the waveguide by depositing Ni-Cr. The temperature of the frequency doubler is controlled by applying a current to the thin-film heater so as to heat the frequency doubler. Even if the wavelength of a semiconductor laser is changed due to change in the environmental temperature, the frequency doubler can stably be operated by changing the temperature of the frequency doubler.

22 Claims, 13 Drawing Sheets

31 DOMAIN NON-INVERTED ELEMENT
31a HARMONIC OUTPUT WHEN DOMAIN IS NOT INVERTED
32 DOMAIN INVERTED FREQUENCY DOUBLER (PRIMARY PERIOD)
32a HARMONIC OUTPUT WHEN DOMAIN IS INVERTED
        (PRIMARY PERIOD)

FREQUENCY DOUBLER AND VISIBLE LASER SOURCE HAVING A HEATER

BACKGROUND OF THE INVENTION

1. Field of the Invention

The present invention realtes to a frequency doubler and a visible laser source using the same which is used in the fields of optical information processing using coherent light, optical applied measurement control and the like.

2. Description of Related Art

FIG. 11 is a drawing showing the structure of a frequency doubler of related art. The generation of a harmonic wave (wavelength: 0.41 μm) relative to a fundamental wave having a wavelength of 0.82 μm or less is described in detail below with reference to the drawing (refer to E. J. Lim, M. M. Fejer, R. L. Byer and W. J. Kozlovxky, "Blue Light generation by frequency doubling in periodically-poled lithium niobate channel waveguide", Electronics Letters, Vol. 27, P731–732. 1989). As shown in FIG. 11, a waveguide 2 is formed in an LiNbO3 substrate 1, and a layer 3 (domain inverted regions) where the domain is periodically inverted is formed across the waveguide 2. The mismatching between the propagation constants of a fundamental wave P1 and a harmonic wave P2 generated can thus be corrected by a periodic structure formed by the domain inverted regions 3 and domain non-inverted regions 5, thereby generating a harmonic wave P1 with a high degree of efficiency from the fundamental wave P1 incident upon an incidence surface 10.

The principle of harmonic amplification is described below with reference to FIG. 12. A domain non-inverted element 31 in which the domain are inverted has no domain inverted regions and thus has a single domain direction. The harmonic output power 31a of the domain non-inverted element 31 merely increases and decreases in repetition. However, the harmonic output power 32a of a domain inverted frequency doubler (primary period) 32 in which the domains are periodically inverted increases in proportion to the square of the length l of the waveguide formed in the element, as shown in the drawing.

However, through the domain inversion, the output power of the harmonic wave P2 relative to the fundamental wave P1 cannot be obtained until quasi phase-matching is established. The establishment of quasi phase-matching is limited to such a case that the periods Λ1 (shown in FIG. 12) of the domain inverted regions are $\lambda/(2(N2\omega - N\omega))$ wherein N$\omega$ is the effective refractive index of the fundamental wave (wavelength $\lambda$) and N2$\omega$ is the effective refractive index of the harmonic wave (wavelength $\lambda/2$). The above-described frequency doubler of related art has a domain inverted structure as a base.

The method of producing the doubler is described below with reference to FIGS. 13a to 13c. As shown in FIG. 13a, a Ti pattern 31 is formed at intervals of several μm on an LiNbO3 substrate 1 consisting of a non-linear optical material by lift-off and evaporation. As shown in FIG. 13b, domain inverted regions 3 in which the domain are inverted to the direction opposite to that of the LiNbO3 substrate 1 are formed by heat treatment at a temperature of about 1100° C. As shown in FIG. 13c, a waveguide 2 is then formed by heat treatment in benzoic acid (at 200° C.) for 20 minutes and then annealing at 350° C. for 3 hours. The frequency doubler produced by the treatment with benzoic acid has the waveguide having a length 1 mm for the fundamental wave P1 having a wavelength of 820 nm and generates the harmonic wave P2 with an output power of 940 nW when the output power of the fundamental wave P1 is 14.7 mW.

In the above-described frequency doubler having as a fundamental component the domain inverted regions, the tolerance for variations of the wavelength of the fundamental wave is as small as 0.1 nm in terms of half band width when the length of the element is 5 mm. Namely, if the laser wavelength is changed by 0.1 nm, the output power is halved. The combination of the frequency doubler with a semiconductor laser diode therefore has the problem that when the laser wavelength of the semiconductor laser diode is changed with a change in the temperature thereof, no harmonic wave is generated or the harmonic output power is significantly changed. This problem is described in detail below.

FIG. 14 shows the relation between a change in the laser wavelength of a semiconductor laser diode and the harmonic output power when the environmental temperature is changed. As shown in FIG. 14, although the harmonic output power is highest at a wavelength of 820 nm, the harmonic output power is halved if the laser wavelength deviates by only 0.05 nm. The tolerance for changes in the laser wavelength of the semiconductor laser diode is thus very small. When the environmental temperature is changed from 20° C. to 21° C., since the oscillation wavelength of the semiconductor laser diode is changed by 0.2 nm from 820 nm to 820.2 nm, the harmonic output power becomes zero. The above frequency doubler thus has such a fault that the harmonic output power is significantly affected by changes in the environmental temperature.

SUMMARY OF THE INVENTION

Accordingly, it is an object of the present invention to provide a frequency doubler which is capable of generating constant harmonic output power even if the environmental temperature is changed, and a visible laser source which uses the frequency doubler.

The present invention has been achieved for solving the above problem, and provides a frequency doubler based on a domain inverted structure which is newly designed so that the constant harmonic output power can be stably obtained even if the temperature of a semiconductor laser diode is changed.

In order to achieve the object, a frequency doubler of the present invention is made of non-linear optical crystal having domain inverted regions and a waveguide, and a thin-film heater formed on the waveguide.

A visible laser source of the present invention has a frequency doubler comprising non-linear optical crystal having domain inverted regions and a waveguide, a semiconductor laser diode and means for controlling the temperature of the frequency doubler by a heater.

The temperature of the frequency doubler of the present invention is controlled by changing the temperature of the frequency doubler using the heater so that the highest harmonic output power can be constantly obtained even if the laser wavelength of the semiconductor laser diode is changed. This is described in detail below.

If the environmental temperature is changed, the condition for quasi phase-matching is not established due to a change in the laser wavelength of the semiconductor laser diode and no harmonic output power can be obtained. As described above, the condition for phase matching between a fundamental wave and a harmonic wave is $\Lambda 1 = \lambda/(2(N2\omega - N\omega))$. Since the period $\Lambda 1$ of the frequency doubler is defined in the process of producing the frequency doubler, the period is not changed even if the environmental temperature is changed. However, the laser wavelength $\lambda$ of the semiconductor laser diode is changed if the environmental temperature is changed. The harmonic output power is thus changed due to a small tolerance for changes in the laser wavelength of the semiconductor laser diode, as shown in FIG. 14. Therefore, even if the laser wavelength of the semiconductor laser diode is changed, the condition for phase matching is satisfied by changing the value of $(N2\omega - N\omega)$ corresponding to the change in the wavelength so that the conditional expression, $\Lambda 1 = \lambda/(2(N2\omega - N\omega))$, is satisfied.

Since the value of $(N2\omega - N\omega)$ has a positive gradient relative to the temperature, as shown in FIG. 15, the value of $(N2\omega - N\omega)$ may be increased by increasing the temperature of the frequency doubler. A thin-film heater is thus formed on the surface of the frequency doubler so as to force the temperature thereof to be controlled. That is, the control of the temperature of the frequency doubler allows the equation, $\Lambda 1 = \lambda/(2(N2\omega - N\omega))$, to be satisfied even if the laser wavelength $\lambda$ of the semiconductor laser diode is changed.

In addition, even if the laser wavelength $\lambda$ of the semiconductor laser diode is deviated from the wavelength for phase matching in the initial stage, the difference in refractive indexes, $(N2\omega - N\omega)$, is changed by changing the temperature of the thin-film heater so that the quasi phase-matching condition, $\Lambda 1 = \lambda/(2(N2\omega - n\omega))$, can be satisfied. The harmonic can thus be generated with a high degree of efficiency.

The visible laser source of the present invention also permits the stability of harmonic output power to be significantly improved by the same function as that described above.

BRIEF DESCRIPTION OF THE DRAWINGS

FIG. is a view showing the structure of a frequency doubler in accordance with a first embodiment of the present invention;

FIGS. 10a to 10e are sectional views showing a process of producing a frequency doubler shown in FIG. 9a;

DESCRIPTION OF THE PREFERRED EMBODIMENTS

Figure 1:
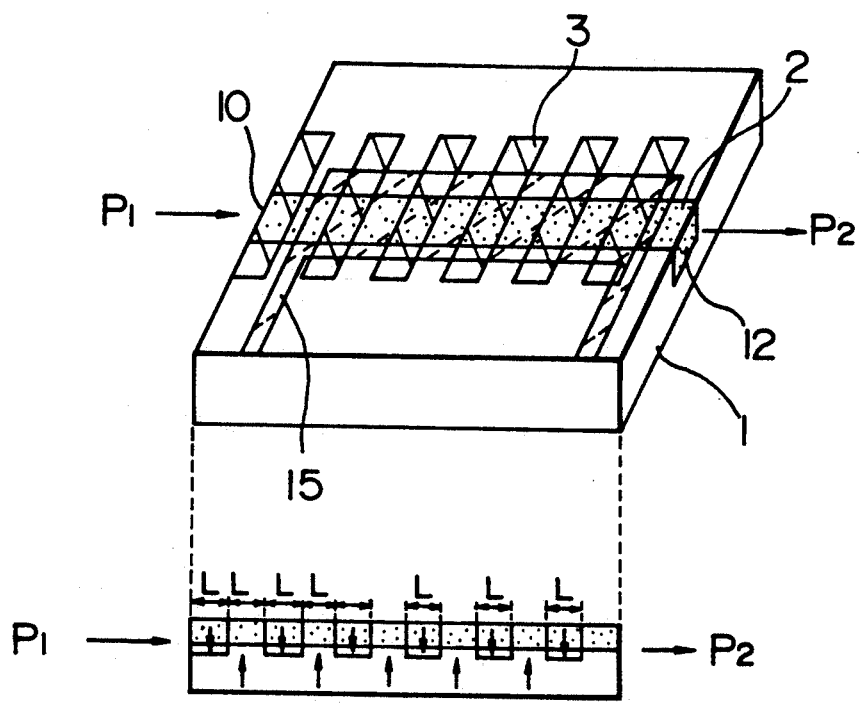

The structure of a frequency doubler according to an embodiment of the present invention is described below with reference to the drawings FIG. 1 is a view showing the structure of a frequency doubler according to a first embodiment of the invention. This frequency doubler is different from a conventional frequency doubler in that a thin-film heater is formed on a waveguide having domain inverted regions formed thereover. In this embodiment, the domain inverted-type frequency doubler comprises an LiNbO$_3$ substrate 1 and a waveguide 2 formed in the substrate 1 by proton exchange. In FIG. 1, reference numeral 1 denotes the LiNbO$_3$ substrate composed of a +Z plate (the + side of the substrate which is cut vertically to the Z axis); reference numeral 2, the waveguide; reference numeral 3, the discrete domain inverted regions; reference numeral 10, an incidence portion for a fundamental wave P1; reference numeral 12, a radiation portion for a harmonic wave P2; and reference numeral 15, an NiCr thin-film heater formed on the waveguide 2.

The fundamental wave P1 (wavelength 840 nm) incident on the waveguide 2 is converted into the harmonic wave P2 (wavelength 420 nm) by a domain inverted region having a length L for phase matching, and the harmonic output power is increased by the next domain non-inverted region having the same length L. In this way, the harmonic output power is increased and radiated from the radiation portion 12.

Figure 2:
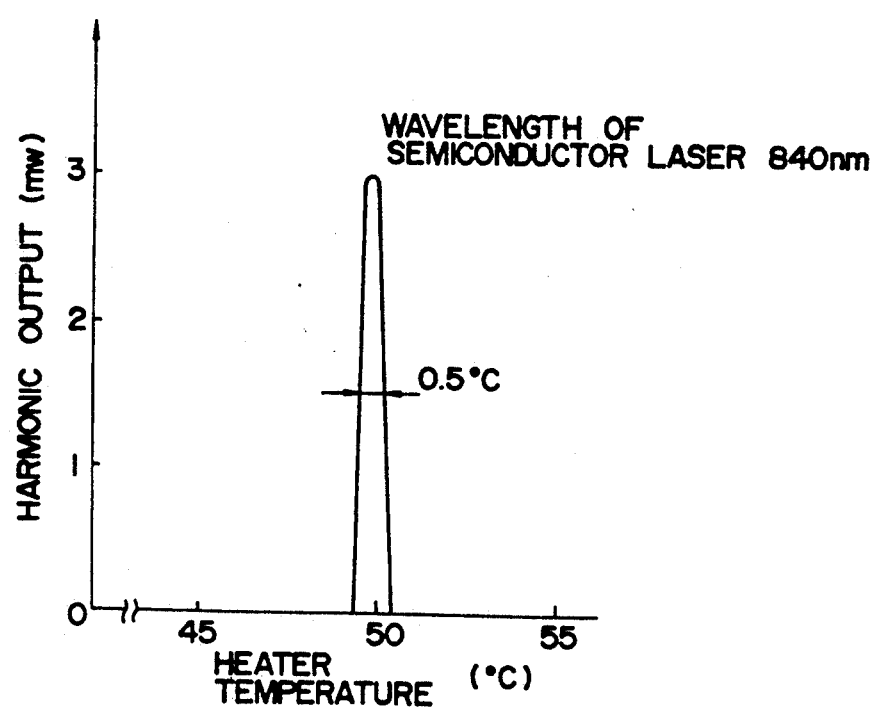
FIG. 2 is a chart showing the relation between the temperature of a frequency doubler of the present invention and the harmonic output power thereof.

FIG. 2 shows the relation of harmonic output power (second harmonic generation) to the temperature of the heater. Since the oscillation wavelength of the semiconductor laser diode is 840 nm, the harmonic output power is highest when the temperature of the frequency doubler is 50° C. Thus it is sufficient if the temperature of the frequency doubler can be kept at 50° C.

The tolerance for the temperature of the heater is as small as 0.5° C. in terms of half band width T. Namely, if the temperature of the heater is deviated by 0.25° C. from the optimum value of 50° C., the output power becomes zero. However, since the temperature of the frequency doubler is controlled to be kept at 50° C. by the thin-film heater 15, the constant harmonic output power can be obtained even if the environmental temperature is changed.

METHOD OF PRODUCING FREQUENCY DOUBLER

Figure 3A:
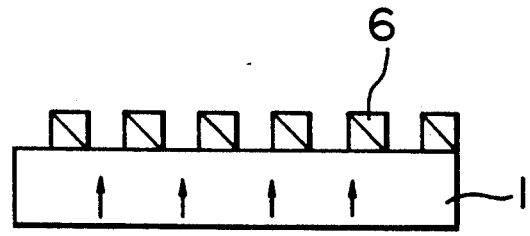
FIGS. 3a to 3d are sectional views showing a process of producing a frequency doubler of the present invention.
Figure 3B:
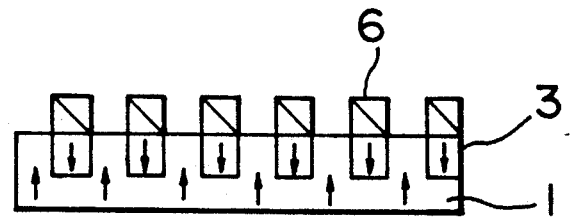

The method of producing the frequency doubler is described below with reference to the drawings. As shown in FIG. 3a, $SiO_2$ 6 is first patterned on the $LiNbO_3$ substrate 1 by usual photolithography and dry etching. As shown in FIG. 3b, the domain inverted regions 3 each having a thickness of 1.4 μm are then formed directly below the $SiO_2$ 6 formed on the $LiNbO_3$ substrate 1 by heat treatment at 1,080° C. for 90 minutes. During heat treatment, the heating rate is 10° C./minute, and the cooling rate is 50° C./minute. A cooling rate of 30° C./min or less is undesirable because nonuniform inversion occurs.

Since the Li content in the portion of the substrate 1 directly below the $SiO_2$ 6 is decreased, only the Curie temperature of the portion becomes lower than that of the substrate 1. The domain inverted regions 3 in which the domain is inverted into the direction opposite to that of the substrate 1 can be formed only in the portion directly below the $SiO_2$ 6 by heat treatment at a temperature below the Curie temperature of the substrate 1 but above the Curie temperature of the portion immediately below the $SiO_2$ 6. The length L of each of the domain inverted regions 3 is 1.5 μm.

Figure 3C:
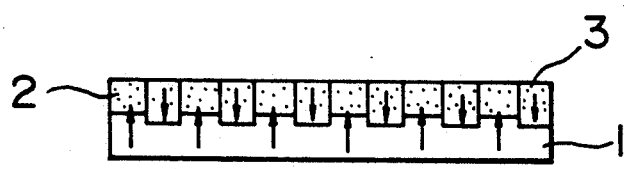

The $SiO_2$ 6 is then removed by etching using a mixed solution containing HF and $HNF_3$ (1:1) for 20 minutes, as shown in FIG. 3c. The method of forming the waveguide 2 in the domain inverted regions 3 by proton exchange is described below with reference to FIGS. 4a to 4d.

Figure 4A:
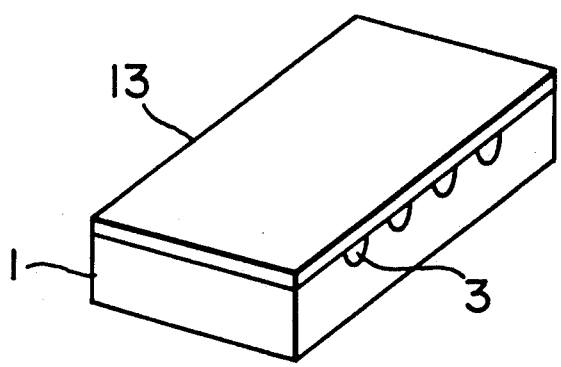
FIGS. 4a to 4d are perspective views showing a process of producing the waveguide of a frequency doubler of the present invention.
Figure 4B:
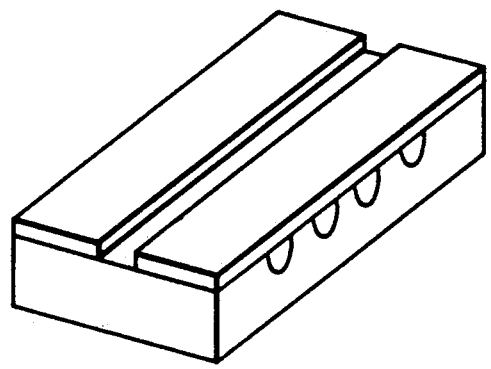
Figure 4C:
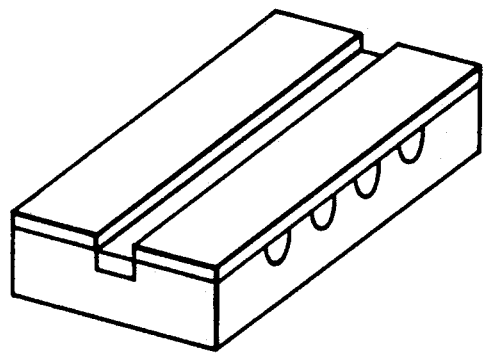
Figure 4D:
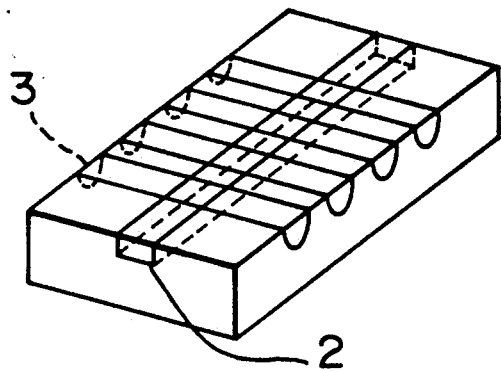

As shown in FIG. 4a, Ta 13 is first deposited by sputtering to form a mask for the waveguide 2. After the Ta mask 13 is patterned in stripes as shown in FIG. 4b, the Ta mask 13 having a slit of 6 μm wide and 25 mm long formed therein is subjected to proton exchange in pyro-phosphoric acid at 230° C. for 2 minutes, as shown in FIG. 4c. After the Ta mask 13 is removed, as shown in FIG. 4d, the substrate 1 is annealed at 350° C. for 1 hour. Annealing treatment causes the formation of a uniform proton-exchanged layer having a decreased propagation loss. The portion directly below the slit of the protective mask, which has been subjected to proton exchange, forms a high-refractive index layer 2 having a refractive index increased by about 0.03. Since light is propagated in the high refractive index layer 2, the high-refractive index layer 2 serves as the waveguide 2.

Figure 3D:
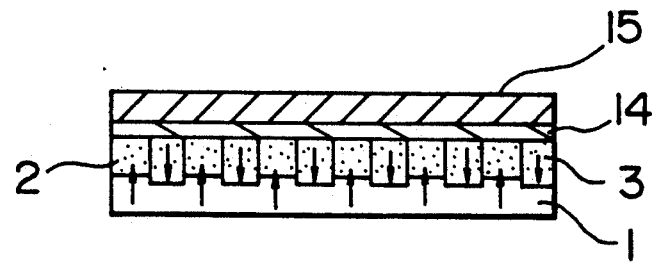

As shown in FIG. 3d, $SiO_2$ 14 having a thickness of 300 nm is finally deposited by evaporation, and an Ni-Cr layer is formed in a thickness of 200 nm. The Ni-Cr layer serves as the thin-film heater 15. Although the temperature can be controlled even if the $SiO_2$ 14 is absent, the $SiO_2$ 14 gives the effect of suppressing the propagation loss of light in the waveguide 2 because the thin-film heater 15 made of metal can avoid making direct-contact with the waveguide 2.

The waveguide 2 with the thin-film heater 15 is formed by the above-described process. The thickness d of the waveguide 2 is 1.2 μm which is smaller than the thickness of 1.4 μm of the domain inverted regions 3. Since all the light propagated by the waveguide 2 is guided through the domain inverted regions 3, the wavelength is effectively converted. The period of the domain inverted regions 3 is 3 μm, and the waveguide 2 is operated at a temperature of 50° C. for a wavelength 840 nm. The incidence portion 10 and the radiation portion 12 are formed by optically polishing the surfaces vertical to the waveguide 2. In this way, the frequency doubler shown in FIG. 1 can be produced.

When a semiconductor laser beam (wavelength 840 nm) was guided as the fundamental wave P1 from the incidence portion 10 shown in FIG. 1, the beam was propagated in a single mode, and the harmonic wave P2 having a wavelength of 420 nm was radiated to the outside from the radiation portion 12 of the substrate 1. The propagation loss of the waveguide 2 was as small as 1 dB/cm, and the harmonic wave P2 was effectively generated. A cause for the increase in output power is that the more uniform waveguide is formed by pyro-phosphoric acid.

When the temperature of the frequency doubler was controlled to 50° C. by heating the thin-film heater by applying a voltage of 10 V passing a current therethrough, a harmonic wave (wavelength 0.42 μm) of 1 mW was stably obtained by input of a fundamental wave of 40 mW regardless of variations of the circumferential temperature.

The present invention is mainly characterized in that although the frequency doubler has a small tolerance for the wavelength, a variation in the laser wavelength of a semiconductor laser diode is corrected by changing the temperature of the frequency doubler so that a harmonic wave can stably be outputted.

Figure 5:
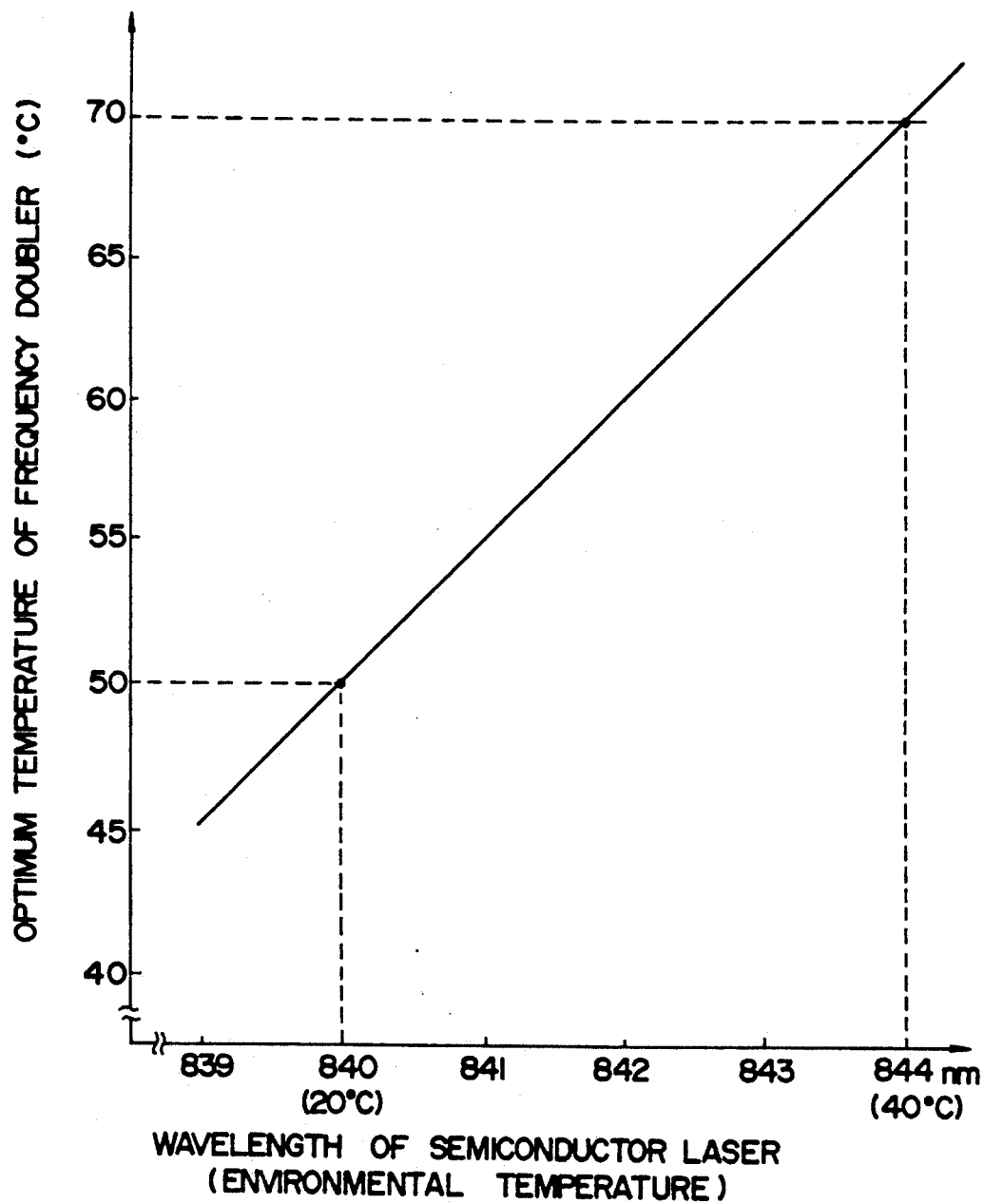
FIG. 5 is a chart showing the relation between the laser wavelength of a semiconductor laser diode and the optimum temperature of a frequency doubler.

FIG. 5 shows the relation between the laser wavelength of the semiconductor laser diode and the optimum temperature of the frequency doubler of the present invention. As seen from FIG. 5, the temperature of the frequency doubler is set to an optimum temperature of 50° C. when the laser wavelength of the semiconductor laser diode is 840 nm. In addition, as seen from FIG. 5, even if the laser wavelength of the semiconductor laser diode is deviated by 1 nm, since the temperature of the frequency doubler is set to the optimum temperature by changing the temperature by 5° C. using the heater, the harmonic output power can become maximum. As described above, the stability of the harmonic output power is significantly improved, as compared with conventional frequency doublers, and the practicability of the frequency doubler of the invertion is thus increased.

It is assumed that a harmonic wave is efficiently outputted by phase-matching at an environmental temperature of 20° C. and a heater temperature 50° C. Even if the environmental temperature is changed by 20° C. from 20° C. to 40° C., and even if the oscillation wavelength of the semiconductor laser diode is changed from 840 nm to 844 nm, the harmonic output power is stably obtained by changing the temperature of the waveguide from 50° C. to the optimum temperature 70° C. with the use of using the thin-film heater so that the condition for phase matching is satisfied. In addition, since the thin-film heater consumes small electric output power and is capable of responding to a variation in temperature at a speed of μs order, the thin-film heater is effective for following changes in the wavelength.

Since multi-mode propagation of the fundamental wave causes the unstable output of a harmonic wave and is thus impracticable, single-mode propagation is effective.

In this embodiment, the optimum temperature (FIG. 5) of the frequency doubler for the laser wavelength of the semiconductor laser diode is set in consideration of a condition of use of the frequency doubler of the present invention. Namely, since the working temperature of the frequency doubler, which is a condition of environment where the frequency doubler is used, is generally close to a room temperature and does not exceed 50° C., the optimum temperature is set to 50° C. which is higher than the working temperature.

If the frequency doubler is used in a place at an environmental temperature of 100° C., it is desirable to set the optimum temperature to 100° C. or more. This is because if the environmental temperature exceeds the optimum temperature, there is the possibility that the frequency doubler is affected by the environmental temperature, but not the heater.

Figure 6:
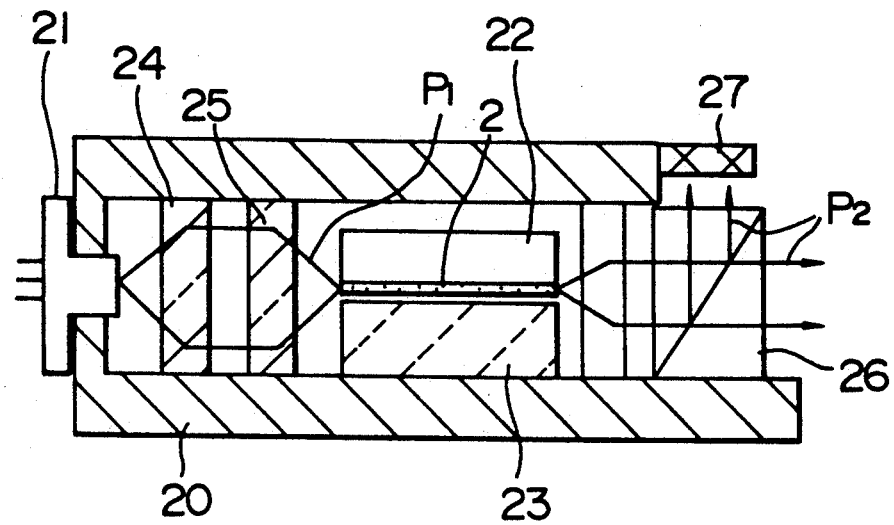
FIG. 6 is a sectional view showing the structure of a visible laser source of the present

A description is now made of a visible laser source according to a second embodiment of the present invention. FIG. 6 shows the structure of a visible laser source. The visible laser source basically comprises a semiconductor laser diode 21 and a frequency doubler 22. The fundamental wave P1 emitted from the semiconductor laser diode 21 fixed to an Al frame 20 is made parallel light by a collimater lens 24 and then introduced into the waveguide 2 of the frequency doubler 22 by a focus lens 25 so as to be converted into a harmonic wave P2. Reference numeral 23 denotes a quartz plate for heat insulating. The structure of the frequency doubler is the same as that of the first embodiment. In this embodiment, the domain inverted regions are formed by heat treatment at 1,100° C. of an MgO-doped LiNbO3 substrate which is higher resistant to optical damage than an LiNbO3 substrate. The treatment temperature is higher than that of LiNbO3 because the Curie temperature is increased by about 80° C. by doping LiNbO3 with MgO. In addition, a proton-exchanged waveguide which could be treated at a temperature lower than the heat treatment temperature during formation of the domain inverted layer was used as a waveguide.

Figure 7:
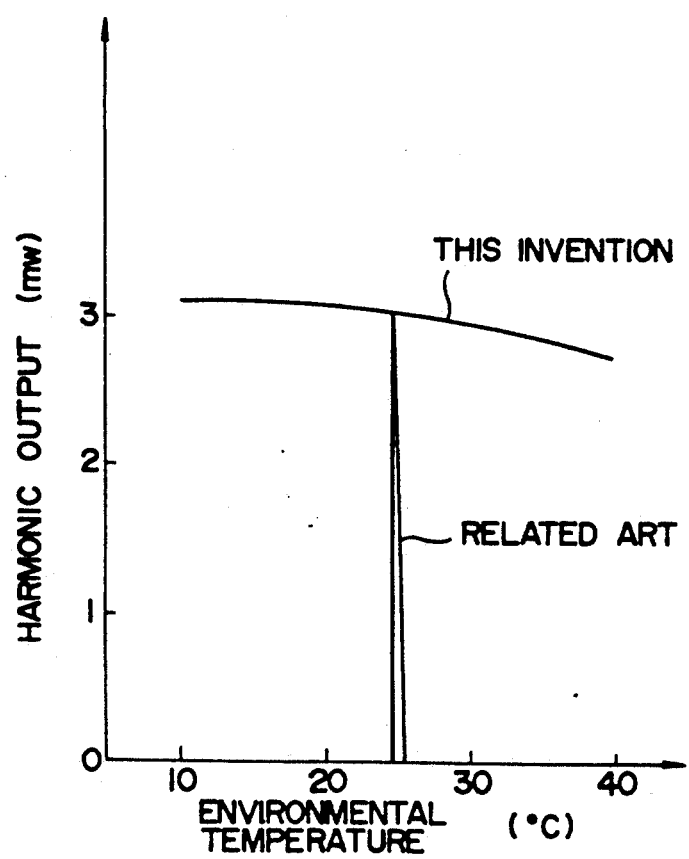
FIG. 7 is a chart showing comparison of the dependency of the harmonic output power of a conventional visible laser source on the environmental temperature with the dependency of a visible laser source of the present invention.

In this embodiment, a visible laser source was produced by combining the frequency doubler 22 and the semiconductor laser diode 21. The output power of the harmonic wave P2 output is divided by a beam splitter 26, detected by an Si detector 27 and then fed back by electrical treatment so that the temperature of the thin-film heater formed in the frequency doubler 22 is kept constant at the highest harmonic output power. The working temperature of the frequency doubler 22 is 55° C. for a wavelength of 830 nm. Since the heater is used, the working temperature must be set to a temperature higher than the room temperature, and the working temperature is preferably set to 50° C. or more in view of the case where the room temperature is increased to 40° C. This point is described above with respect to the first embodiment. The working temperature can be freely set only by changing the period of the domain inverted regions. The temperature of the waveguide 2 of the frequency doubler 22 is changed by the thin-film heater formed in the frequency doubler 22 in correspondence with a change in the laser wavelength of the semiconductor laser diode 21, thereby stabilizing the harmonic output power. FIG. 7 shows the dependency of the visible laser source produced on the environmental temperature.

Although the harmonic output power generated by a conventional visible laser source becomes zero when the environmental temperature is changed, the laser source of the present invention outputs a harmonic wave even if the environmental temperature is changed. In fact, the harmonic output power is very stable within the range of 30° C.

Table 1 shows comparison between the harmonic output power of a conventional visible laser source with a visible laser source of the invention at environmental temperatures of 25° C. and 30° C. At an environmental temperature of 25° C., the harmonic output power of the

TABLE 1

| Environmental temperature | Conventional visible laser source | Visible laser source according to the invention |
| --- | --- | --- |
| 25 deg. C. | 3 mW | 3 mW |
| 35 deg. C. | 0 mW | 3 mW | conventional visible laser source is 3 mW at the highest because the frequency doubler thereof satisfies the condition of quasi phase-matching. However, at 35° C., the harmonic output power of the conventional visible laser source is zero since the condition of quasi phase-matching is not established due to the effect of the environmental temperature upon the frequency doubler. However, since the temperature of the waveguide of the frequency doubler of the invention is controlled by the heater, the harmonic output power is constantly kept at the highest (3 mW) even if the environmental temperature is changed.

Although the thin-film heater is used in this embodiment, the temperature can be controlled by using a usual heater.

Figure 8:
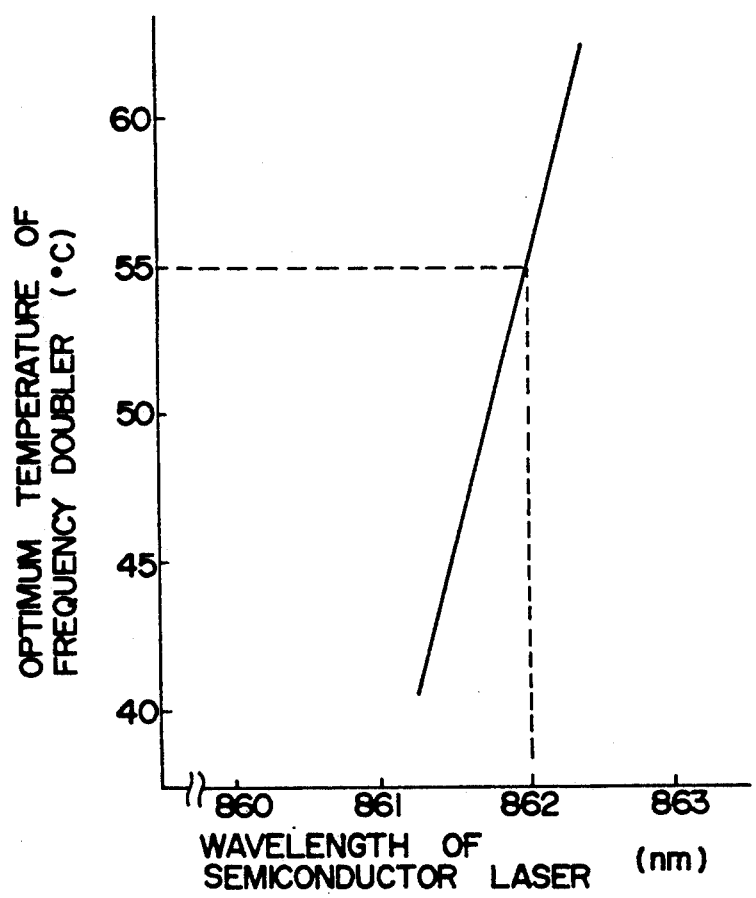
FIG. 8 is a chart showing the relation between the laser wavelength of a semiconductor laser diode and the optimum temperature of a frequency doubler.

A frequency doubler in accordance with a third embodiment of the present invention is described below. The structure of the frequency doubler is the same as that of the first embodiment. In this embodiment, an LiTaO3 substrate was used in place of the LiNbO3 substrate. Since the Curie temperature of LiTaO3 is as low as 620° C., domain inversion treatment can be performed at a low temperature. The waveguide 2 was produced by proton exchange in pyrophosphoric acid and had a thickness of 2 μm, a width of 4 μm and a length of 2 cm. Ti was deposited on the waveguide 2 by evaporation to form a thin-film heater. The period of domain inverted regions was 4 μm, and had a thickness of 1.5 μm. FIG. 8 shows the relation between the laser wavelength of a semiconductor laser diode and the optimum temperature of the frequency doubler. The working point of the frequency doubler is 55° C. for a wavelength of 862 nm. In this embodiment, the conversion efficiency was 2% with input of 40 mW, and the harmonic output power was very stable without optical damage.

Figure 9A:
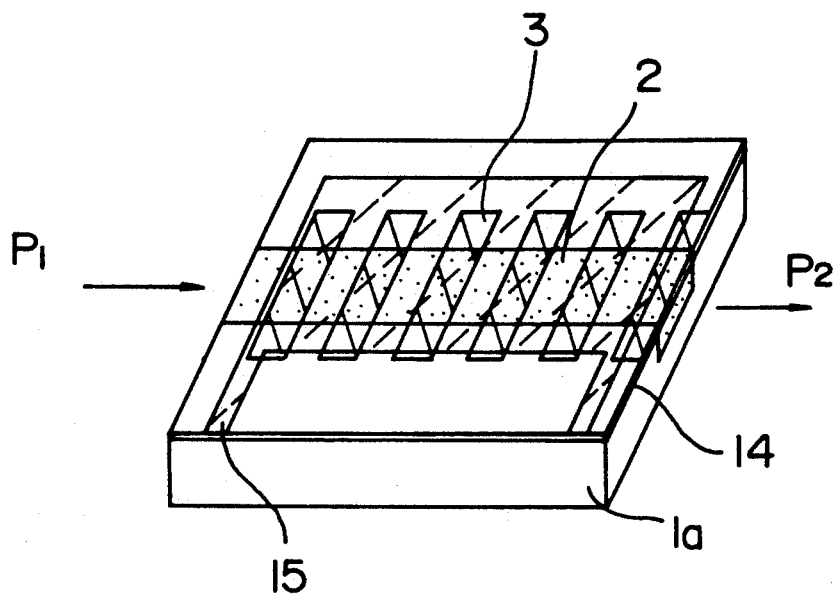
FIGS. 9a and 9b are perspective and sectional view respectively, showing the structure of a frequency doubler in accordance with a fourth embodiment of the present invention.
Figure 9B:
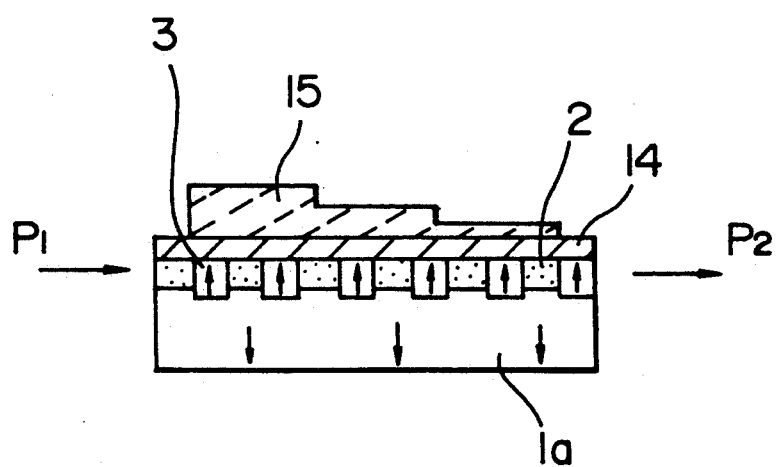

A frequency doubler in accordance with fourth embodiment of the present invention is described below FIGS. 9a and 9b show the structure of the frequency doubler In this embodiment, an LiTaO3 substrate was used. A domain inverted layer 3 and a waveguide 2 were formed on the −Z plane of an LiTaO3 substrate La, and a thin-film heater 15 was formed on the waveguide 2 so that the thickness thereof was changed in three stages in the direction of progress of the waveguide 2. In this embodiment, the thickness of the thin-film heater is changed for increasing the tolerance of the harmonic output power for the fundamental wave P1 (the wavelength of the semiconductor laser). The reason for this is described below.

Figure 14:
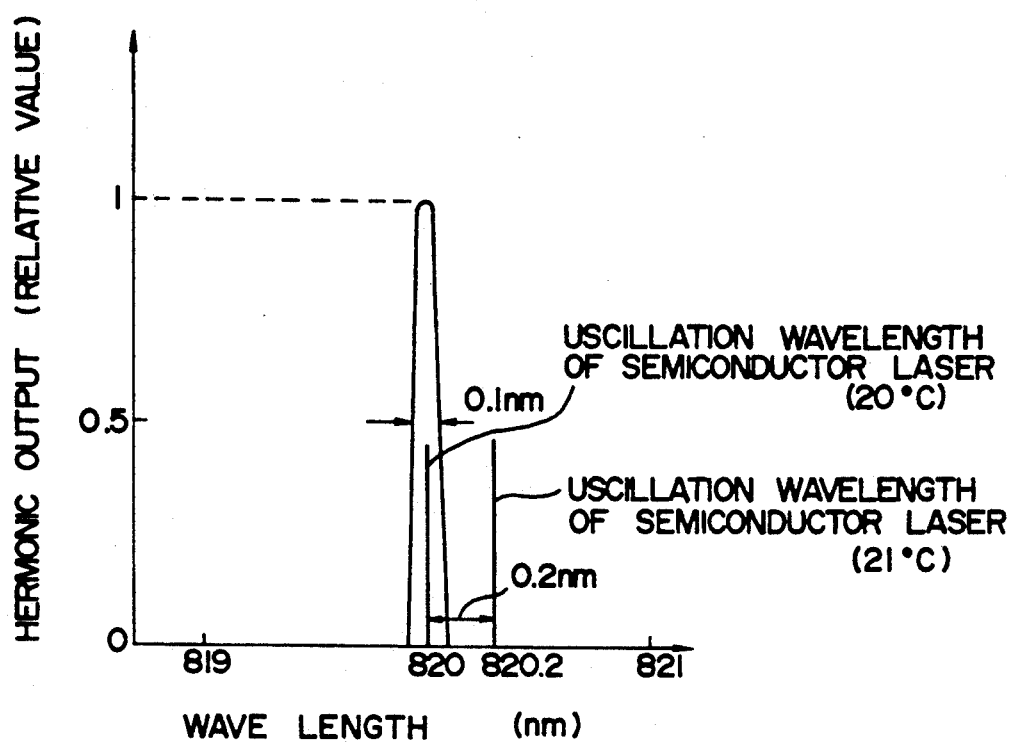
FIG. 14 is a chart showing the relation between the wavelength and the harmonic output power generated by a frequency doubler when the temperature is changed.
Figure 15:
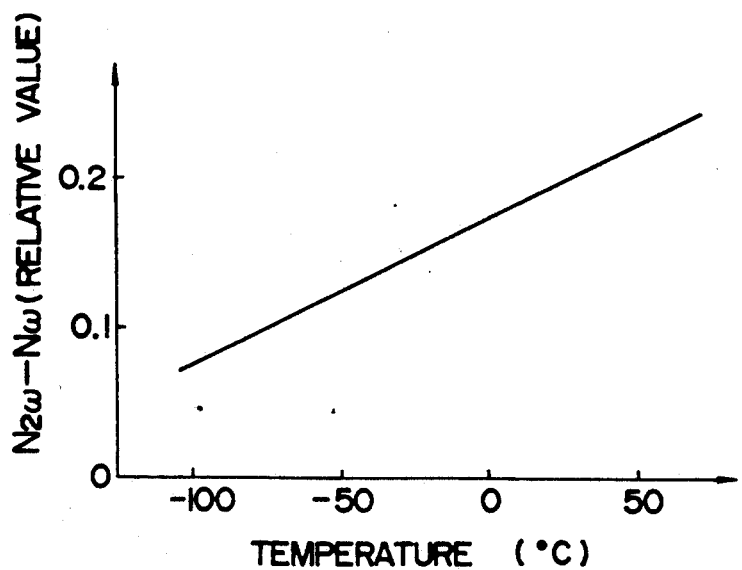
FIG. 15 is a chart showing the relation between temperature and the difference in refractive index, $(N2\omega - N\omega)$.

As described above, with respect to the problem to be solved and as shown in FIG. 14, the tolerance of the harmonic wave for the wavelength of the fundamental wave P1 is small. In the first to third embodiments, therefore, the thin-film heater is formed on the frequency doubler so as to control the temperature thereof, whereby a harmonic wave can stably be outputted. In this embodiment, the thickness of the thin-film heater formed on the frequency doubler is changed so as to give a temperature gradation to the frequency doubler and thus increase the tolerance. As described above, the condition of phase matching for outputting the harmonic wave relative to the fundamental wave having a wavelength $\lambda$ is $\Lambda 1 = \lambda/(2(N2\omega - N\omega))$. It is found from the equation that since the value of $(N2\omega - N\omega)$ is changed by changing the temperature of the frequency doubler, as shown in FIG. 15, the wavelength $\lambda$ of phase matching is also changed. This phenomenon may be employed for increasing the tolerance for the wavelength of the fundamental wave. This is described below with reference to FIGS. 16a to 16c.

Figure 16A:
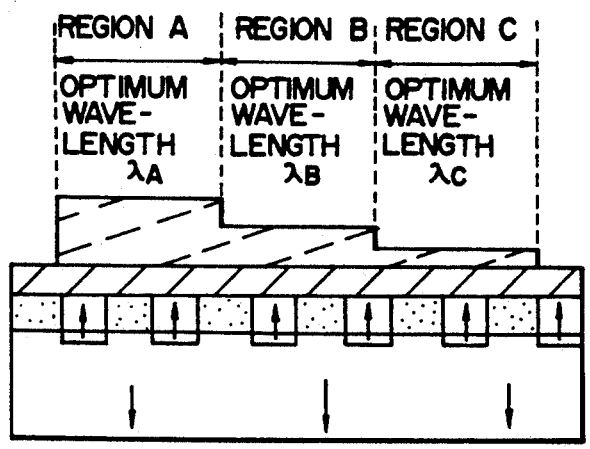
FIG. 16a is a sectional view showing a frequency doubler of the present invention.
Figure 16B:
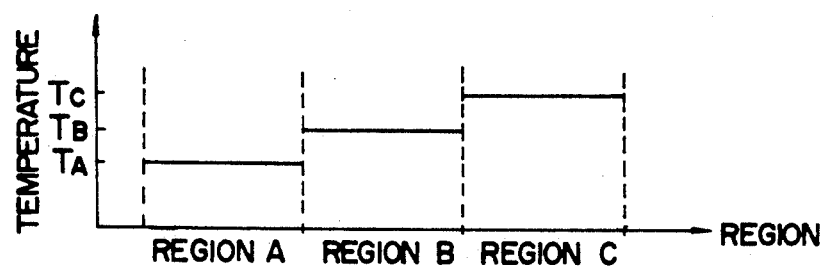
FIG. 16b is a chart showing the temperature distribution in each of regions.

FIG. 16a is a sectional view of the frequency doubler comprising the thin-film heater having a thickness which is changed in three stages. The thickness of regions A, B, C of the thin-film heater are different from each other. The current resistance is decreased, and the temperature is thus decreased, as the thickness of the heater is increased. As shown in FIG. 16b, the temperature gradations in the regions A, B and C of the heater are $T_A$, $T_B$, and $T_C$, respectively ($T_A < T_B < T_C$).

Figure 16C:
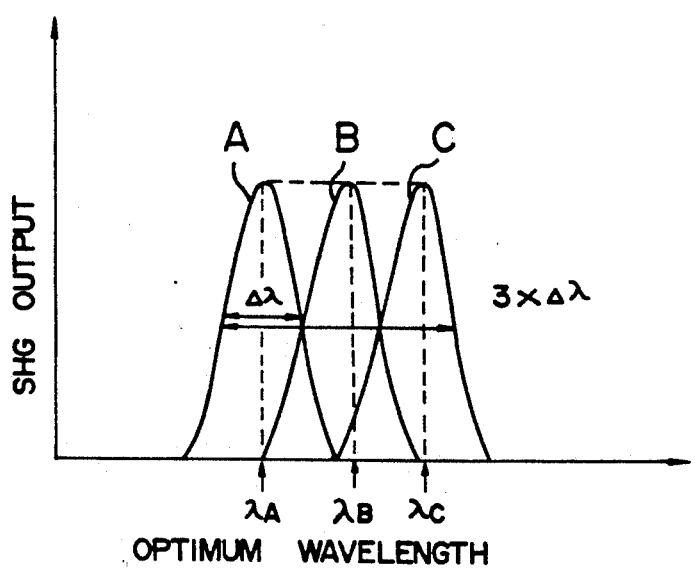
FIG. 16c is a chart showing the relation between the optimum wavelength and the harmonic output power.

FIG. 16c shows the output power of the harmonic wave (SHG) relative to the wavelength of the fundamental wave. As seen from FIG. 16c, the optimum temperature for converting the fundamental wave into the harmonic wave is changed with changes in the temperature of the heater. This is because the value of $(N2\omega - N\omega)$ of the equation $\Lambda 1 = \lambda/2((N2\omega - N\omega))$ which is the condition of phase matching is changed with changes in the temperature, and the wavelength $\lambda$ is thus changed for satisfying the phase-matching condition. The optimum wavelengths in the regions A, B and C are $\lambda_A$, $\lambda_B$ and $\lambda_C$, respectively.

When fundamental light having a wavelength $\lambda_B$ is incident on the frequency doubler, the fundamental wave is passed through the region A without wavelength conversion because the wavelength of the fundamental wave is deviated from the convertible wavelength range in the region A. The fundamental wave passed through the region A is subjected to wavelength conversion in the region B since the wavelength $\lambda_B$ is within the convertible wavelength range. The harmonic wave and the fundamental wave which is not converted in the region B are passed through the regions B and C without wavelength conversion and radiated to the outside of the doubler by the same reason as that in the region A.

A fundamental wave of a wavelength $\lambda_A$ or $\lambda_C$ is also subjected to wavelength conversion only in the corresponding region (region A or C) and passed through the other regions.

The operation of the frequency doubler of this embodiment is described above. The frequency doubler enables all fundamental waves of wavelengths $\lambda_A$, $\lambda_B$ and $\lambda_C$ to be converted, a fundamental wave $\lambda$ having a wavelength within the range from $\lambda_A$ to $\lambda_C$ to be converted into a harmonic wave P2, and the wavelength tolerance becomes three times as wide as that of a conventional frequency doubler.

As described above, in this embodiment, the temperature gradation can be given to the frequency doubler by using the thin-film heater formed thereon, thereby increasing the tolerance of harmonic output power for the fundamental wave.

Figure 10A:
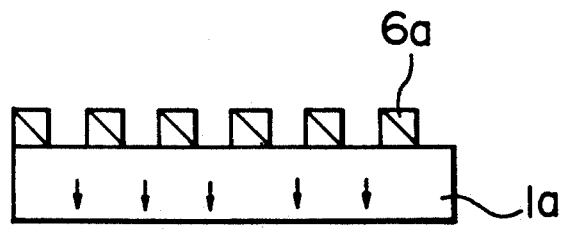
Figure 10B:
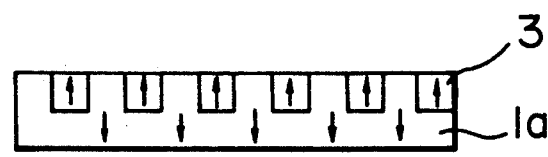
Figure 10C:
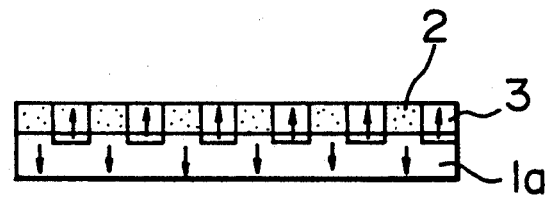
Figure 10D:
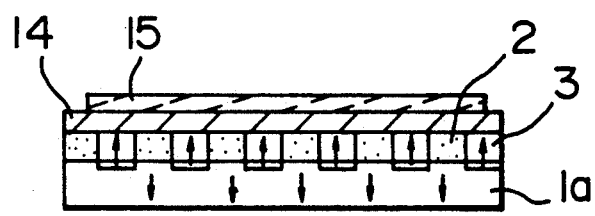
Figure 10E:
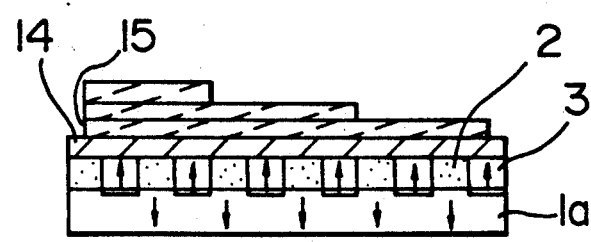
Figure 11:
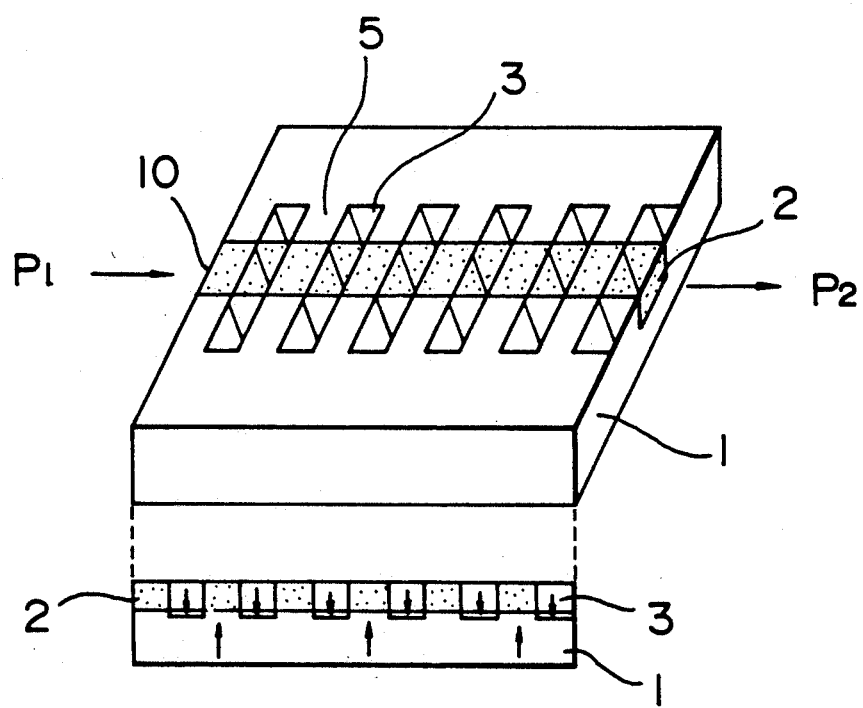
FIG. 11 is a perspective view showing the structure of a frequency doubler of related art.
Figure 12:
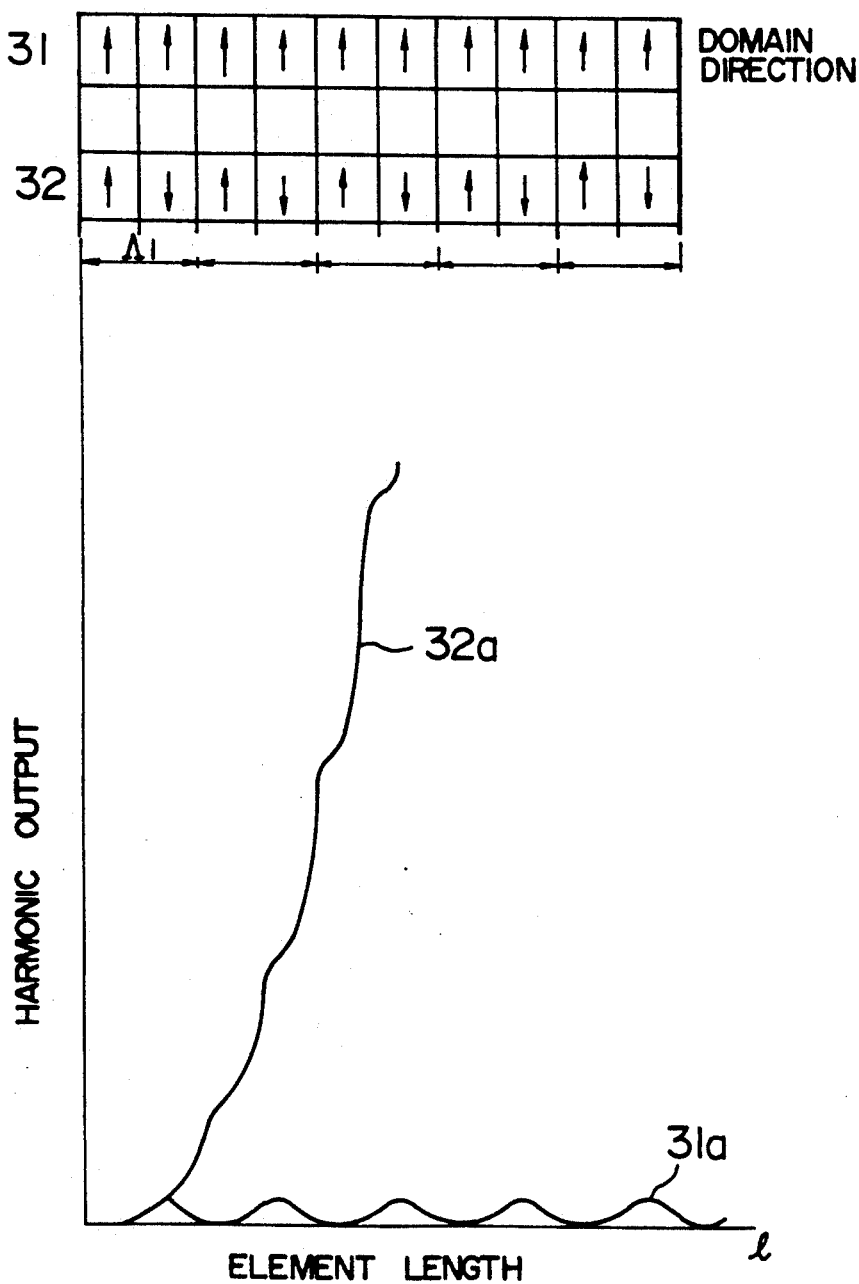
FIG. 12 is a chart showing the principle of wavelength conversion by a frequency doubler.
Figure 13A:
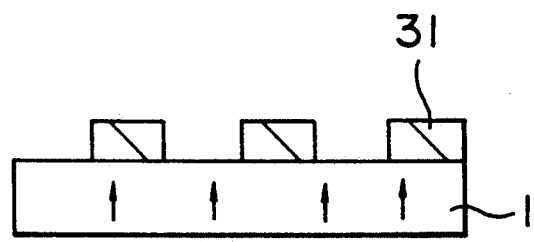
FIGS. 13a to 13c are sectional views showing a process of producing a frequency doubler of related art.
Figure 13B:
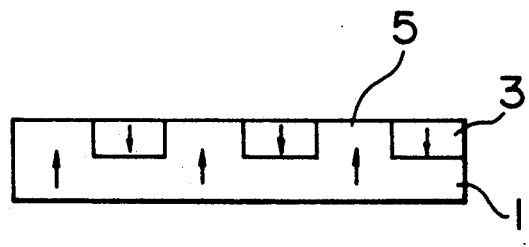
Figure 13C:
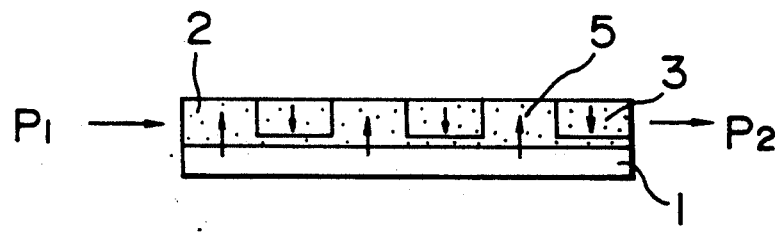

The method of producing this frequency doubler is described below with reference to FIGS. 10a to 10e. As shown in FIG. 10a, Ta 6a is patterned in a periodic form on an LiTaO$_3$ 1a by a usual photolithograph process and dry etching. As shown in FIG. 10b, a proton exchanged layer having a thickness of 0.8 μm is formed by proton exchange in pyro-phosphoric acid at 260° C. for 30 minutes directly below the slits of the LiTaO$_3$ substrate 1a having the Ta pattern 6a formed thereon, and then heated at 550° C. for 1 minute to periodically form domain inverted regions 3. As shown in FIG. 10c, Ta is then patterned in stripes having periods of 30 nm to form a protective mask for proton exchange, followed by proton exchange at 260° C. for 16 minutes. A waveguide 2 is then formed by annealing at 380° C. for 10 minutes. As shown in FIG. 10d, SiO$_2$ is then deposited to form a protective film, and a Ti film serving as a thin-film heater 15 is then formed. As shown in FIG. 10e, a Ti pattern is then formed by evaporation using a mask process so that the thickness is changed in two stages. The Ti pattern has a thickness which is changed in the three stages of 100 nm, 200 nm and 300 nm. In the final stage, incidence and radiation surfaces are formed by polishing. The waveguide 2 has a thickness of 1.9 μm, a width of 4 μm and a length of 1 cm. The domain inverted regions have periods $\Lambda 1$ of 3.8 μm and a thickness of 1.8 μm. The thickness of the thin-film heater 15 of Ti is stepwisely changed so that the temperature of the waveguide is changed in the forward direction of the waveguide. The accuracy required for temperature control can thus be relieved. Although temperature control with a degree of accuracy of 2° C. is required for wavelength tolerance of 0.1 nm in the case where there is no stepwise change, the accuracy for temperature control can be relieved to a degree of 18° C. by changing the thickness of the thin-film heater in three stages, as in this embodiment. The working temperature for a wavelength of 840 nm is 55° C.

Although, in this embodiment, the thickness of the thin-film heater is stepwisely changed, the width or composition of the heater can be changed in the direction of progress of the waveguide. If the thickness or the like is smoothly changed in place of stepwise change, the same effects as those described above can be obtained.

In addition, although LiNbO$_3$ or LiTaO$_3$ is used as a non-linear optical material in the embodiments, a ferroelectric substance such as KNbO$_3$, KTP or the like, and an organic material such as MNA or the like can be used.

As described above, in the frequency doubler of the present invention, the thin-film heater for controlling the temperature of the frequency doubler having domain inverted regions is formed thereon so as to satisfy the condition of quasi phase-matching, thereby simply and safely generating a harmonic wave. The visible laser source of the present invention enables the stable output of a harmonic wave since a change in wavelength of the semiconductor laser diode is corrected by temperature control using the heater.

The frequency doubler of the present invention also permits the output of a harmonic wave from the waveguide and the stable and simple formation of a spot without stigmatism. The frequency doubler thus has excellent practical effects.

What is claimed is:

1. A frequency doubler comprising:
   a non-linear crystal substrate;
   a waveguide formed on said substrate;
   a plurality of discrete domain inverted regions disposed on said substrate along said waveguide; and
   a thin-film heater disposed on said waveguide for controlling a temperature of said frequency doubler.

2. A frequency doubler according to claim 1, wherein said non-linear crystal substrate is made of $LiNb_1Ta_{1-x}O_3$ ($0 \leq X \leq 1$).

3. A frequency doubler according to claim 1, wherein said waveguide is a proton-exchanged waveguide.

4. A frequency doubler according to claim 1, wherein said thin-film heater is made of Ni-Cr.

5. A frequency doubler according to claim 1, wherein said thin-film heater control said temperature that said frequency doubler has a working temperature substantially equal to or greater than 50 deg. C.

6. A frequency doubler as set forth in claim 1, wherein said thin film heater is disposed along said waveguide and has a thickness or width that changes smoothly or stepwisely along said waveguide.

7. A visible laser source comprising:
   (a) a frequency doubler comprising a non-linear crystal substrate, a waveguide formed on said substrate, a plurality of discrete domain inverted regions disposed on said substrate along said waveguide, said frequency doubler being adapted to be operated at a working temperature;
   (b) a semiconductor laser diode for emitting a laser beam into said waveguide; and
   (c) a heater, operatively associated with said frequency doubler, for heating said frequency doubler so as to control the working temperature thereof.

8. A visible laser source according to claim 7, wherein said non-linear crystal substrate is made of $LiNb_1Ta_{1-x}O_3$ ($0 \leq x \leq 1$).

9. A visible laser source according to claim 7, wherein said waveguide is a proton-exchanged waveguide.

10. A visible laser source according to claim 7, wherein said heater heats said frequency doubler such that said working temperature of said frequency doubler is substantially equal to or greater than 50 deg. C.

11. A visible laser source according to claim 7, further comprising a detector and a beam splitter, said frequency doubler converting said laser beam into a harmonic wave and providing said harmonic wave to said beam splitter, said beam splitter causing said harmonic wave to branch out to said detector, and said detector, responsive to said harmonic wave received via said beam splitter, generating a signal for controlling said heater.

12. A frequency doubler comprising:
    a non-linear crystal substrate;
    a waveguide disposed on said substrate and having an incidence portion and a radiation portion;
    a plurality of discrete domain inverted regions periodically formed on said substrate along said waveguide, for converting a basic wave introduced into said waveguide through said incidence portion into a harmonic wave wherein said harmonic wave is output from said radiation portion with amplified power, and
    a thin film heater formed on and along said waveguide for controlling a temperature of said frequency doubler in response to a current applied to said thin film heater so as to achieve stable output of said harmonic wave from said radiation portion.

13. A frequency doubler according to claim 12, wherein said non-linear crystal substrate is made of $LiNb_1Ta_{1-x}O_3$ ($0 \leq x \leq 1$).

14. A frequency doubler according to claim 12, wherein said waveguide is a proton-exchanged waveguide.

15. A frequency doubler according to claim 12, wherein said thin-film heater is made of Ni-Cr.

16. A frequency doubler according to claim 12, wherein said thin film heater controls said temperature such that said frequency doubler has a working temperature substantially equal to or greater than 50 deg. C.

17. A frequency doubler as set forth in claim 12, wherein said thin film heater has a thickness or width that changes smoothly or stepwisely along said waveguide.

18. A visible laser source comprising:
    (a) a semiconductor laser source for emitting a laser beam; and
    (b) a frequency doubler comprising a non-linear crystal substrate, a waveguide disposed on said substrate and having an incidence portion and a radiation portion, a plurality of discrete domain inverted regions periodically formed on said substrate along said waveguide, for converting said laser beam emitted from said semiconductor laser and introduced into said incidence portion into a harmonic wave wherein said harmonic wave is output from said radiation portion with an amplified power, and a heater for heating said frequency doubler so as to control a working temperature thereof in response to a current applied to said heater so as to achieve stable output of said harmonic wave from said radiation portion.

19. A visible laser source according to claim 18, wherein said non-linear crystal substrate is made of $LiNb_1Ta_{1-x}O_3$ ($0 \leq x \leq 1$).

20. A visible laser source according to claim 18, wherein said waveguide is a proton-exchanged waveguide.

21. A visible laser source according to claim 18, wherein said heater controls said temperature such that said working temperature of said frequency doubler is substantially equal to or greater than 50 deg. C.

22. A visible laser source according to claim 18, further comprising a beam splitter and a detector, said frequency doubler converting said laser beam into said harmonic wave and providing said harmonic wave to said beam splitter, said beam splitter causing said harmonic wave to branch out to said detector, said detector, responsive to said harmonic wave received via said beam splitter, generating a signal for controlling said heater.

* * * * *